United States Patent [19]

Cohen

[11] Patent Number: 4,491,423

[45] Date of Patent: Jan. 1, 1985

[54] RESUSCITATION ASSISTIVE TIMER

[76] Inventor: Stanley Cohen, 440 Breakwater Ridge, Atlanta, Ga. 30328

[21] Appl. No.: 545,591

[22] Filed: Oct. 26, 1983

Related U.S. Application Data

[63] Continuation of Ser. No. 243,848, Mar. 16, 1981.

[51] Int. Cl.³ .............................................. G04F 8/00
[52] U.S. Cl. ...................................... 368/107; 368/89; 340/309.15; 340/309.4
[58] Field of Search ...................... 128/202.28, 205.13, 128/205.16, 204.21, 28, 2 R; 434/265; 84/1.03; 328/62, 63; 368/107, 108, 109; 340/309.15, 309.4

[56] References Cited

U.S. PATENT DOCUMENTS

| | | | |
|---|---|---|---|
| 1,918,041 | 7/1933 | Knapke | 434/265 X |
| 2,810,384 | 10/1957 | Bloxsom | 128/28 |
| 3,276,147 | 10/1966 | Padellford | 434/265 |
| 3,358,068 | 12/1967 | Campbell | 84/1.03 |
| 3,509,899 | 5/1970 | Hewson | 128/28 X |
| 3,802,417 | 4/1974 | Lang | 128/2 R |
| 3,889,663 | 6/1975 | Fryer | 128/28 |
| 4,092,788 | 6/1978 | Gowing | 128/28 |
| 4,193,064 | 3/1980 | Snyder | 340/384 E |
| 4,297,999 | 11/1981 | Kitrell | 128/205.16 |

Primary Examiner—Bernard Roskoski
Attorney, Agent, or Firm—Weingarten, Schurgin, Gagnebin & Hayes

[57] ABSTRACT

A resuscitation-assistive timer is utilized to provide audio or visual signals which act as cues to aid pediatric and adult resuscitations by indicating timing for chest compression and respiratory effort in cardio-pulmonary resuscitation. Short audio and visual signals are utilized to indicate the compression period whereas an elongated audio and/or visual signal is used to indicate the period for respiratory effort. For infants a ratio of five compressions to each respiratory effort is utilized, with the respiratory effort taking approximately two times as long as the cardiac compression. In one embodiment short pulses to signal chest compression are provided by a one-shot multivibrator which is actuated by a series of counted-down pulses from a variable frequency oscillator which may be set in accordance with the age of the individual to whom resuscitation is applied. The counted-down signals may also be further counted down and utilized to actuate a second one-shot multivibrator for the production of an elongated pulse during which respiratory effort is applied to the patient.

15 Claims, 4 Drawing Figures

RESUSCITATION ASSISTIVE TIMER

This is a continuation of application Ser. No. 243,848, filed Mar. 16, 1981.

FIELD OF THE INVENTION

This invention relates to resuscitation methods and apparatus and more particularly to an infant resuscitation assistive device utilizing audio or visual cues.

BACKGROUND OF THE INVENTION

Adult resuscitation has been practiced in which cardiopulmonary resuscitation (CPR) is self-timed, with the timing having been practiced on a CPR model. The model simulates an adult and the rhythms utilized for chest compression and breathing of the victim are readily learned in that these actions correspond to natural rhythms of an adult who is providing the resuscitative effort.

CPR training concentrates on providing the trainee with sufficient practice so that he or she may provide the correct number of compressions per minute and also the correct number of respirations per minute. While this timing is effective for adult patients, in children from ages 1 through 12 or infants up to one year of age, the optimal number of compressions per minute and the optimal number of respirations per minute vary markedly over those learned in the CPR course. In general, an adolescent and/or adult requires 60 compressions per minute and 12 respirations per minute. This is contrasted to a child of 1 to 12 years of age, who requires 80 compressions per minute and 16 respirations per minute; or to an infant, who requires 100 compressions per minute and 20 respirations per minute.

Training for adult CPR is thus insufficient to provide proper resuscitation for infants and children, especially when stress and confusion may interfere with the adaption of adult CPR techniques to pediatric patients. This stress or confusion is compounded when two people perform the CPR and attempts are made to synchronize the effort of the person performing the chest compression with the effort of the person performing the respiration. Moreover, it is virtually impossible to instruct untrained personnel at the time that resuscitation is required, which prevents relieving the person practicing the resuscitation with otherwise untrained individuals who may be in the area.

The problem of resuscitation of infants and children is particularly acute in the so-called crib death syndrome and also in the recovery from anesthesia. When infants and children arrest, whether in the emergency room or ambulance, oftentimes traditional CPR training is ineffective to effectuate resuscitation, since nonpediatrically-trained personnel may not have the skill to resuscitate arresting infants or children.

SUMMARY OF THE INVENTION

In the subject invention, a resuscitation-assistive timer is utilized which provides audio and visual signals used as cues for the applying of repeated compressive pressure to the chest of a patient, followed by a respiratory effort in which mouth-to-mouth resuscitation is utilized. The audio-visual cues are achieved by providing, in one embodiment, five short audible signal pulses followed by a relatively long audible signal pulse, with the compressive effort being applied with each short signal pulse, and with the mouth-to-mouth resuscitation being applied during the relatively long audible signal. Simultaneously, a visual signal having the same pulsed waveform is provided by a light source such as a light emitting diode (LED).

It has been found that for proper resuscitation, the amount of time spent in respiratory effort is approximately two times the total amount of time occupied in applying chest compressions. For one type of cardiopulmonary resuscitation, it has been found that five chest compressions followed by a relatively prolonged period of mouth-to-mouth resuscitation is most effective. In the case of infants, the 5:1 ratio if most effective when either one or two people perform the cardiopulmonary resuscitation. This ratio is the same for older children and adults when two people perform the CPR. However, a ratio of 15:2, fifteen compressions followed by two respirations, is most effective for older children or adults when only a single person is available.

It should be noted that while the subject invention is described in terms of pediatric resuscitation, it is not limited thereto, since the utilization of audio and visual cues of the type described is not only useful in pediatric resuscitations but also for adult resuscitations. Moreover, the subject technique is also useful for on-site training of those either partially trained or untrained individuals who are in the area when a patient arrests. The utilization of audio and visual cues during resuscitation counteracts stress and confusion during the resuscitation attempt. Additionally, for the pediatric patient the subject system provides what could be termed "unnatural timing" for an adult who attempts to resuscitate a pediatric patient.

In order to provide the audio and visual signals, in one embodiment a one-shot monostable multivibrator is clocked from the output of a variable frequency oscillator, the output of which is divided or counted down so as to provide the requisite number of pulses per minute for chest compressions. The period of the one-shot monostable multivibrator is short, such that the pulses are relatively short in duration. These pulses are applied both to actuate an audio oscillator connected to a speaker and are also amplified and applied to a lamp or light emitting diode for the production of simultaneously generated audio and light signal pulses.

The counted-down signal from the variable frequency oscillator is further divided or counted down and is provided as an actuation signal to a second one-shot monostable multivibrator, which provides as its output an elongated pulse, again applied to both the aforementioned audio oscillator and the amplifier for the production of an elongated audio and visual signal cue.

In one embodiment the second count-down circuit is set to count five pulses and on the sixth pulse to provide an actuation signal to the monostable multivibrator associated with the long pulse. The length of the pulse produced by this latter monostable multivibrator is controlled such that it begins with the leading edge of the sixth pulse and concludes with the trailing edge of the sixteenth pulse. This makes the duration of the elongated pulse equivalent to the time period occupied by five of the pulses from the first-mentioned multivibrator.

Depending on the age of the patient, the frequency of the variable frequency oscillator may be varied, it being understood that the length of the elongated pulse is to be varied so that its period corresponds to twice that of the new period for the pulses associated with chest compression. Moreover, for one person resuscitation used for teenage or adult patients, the number of counted-down pulses may be varied so as to provide fifteen pulses prior to actuating the monostable multivibrator associated with the long pulse. The person performing the respiratory resuscitation may then be instructed to breath the patient twice during the elongated cue; or the cue may be broken midway to provide two cues.

In so doing, a resuscitation-assistive timer is provided which is adaptable to the age of the patient and the number of persons performing the resuscitation. Moreover, it is useful in providing cues not only for those trained in pediatric resuscitations, but also for those trained in adult resuscitation, as well as those who are either untrained or partially trained.

BRIEF DESCRIPTION OF THE DRAWINGS

These and other features of the present invention will be better understood in connection with the following exemplary detailed description taken in conjunction with the drawings, of which.

DETAILED DESCRIPTION

The present invention contemplates a resuscitation prompter that provides timing cues for the optimal use of resuscitation techniques in reviving cardiac arrest patients particularly of young age.

Figure 1A:
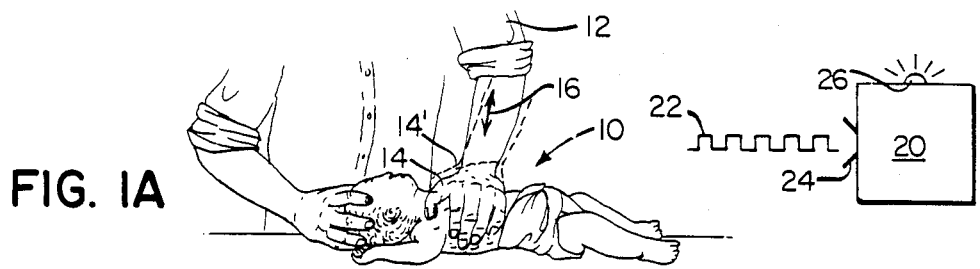
FIGS. 1A and 1B are illustrative diagrams showing in FIG. 1A a compressive effort applied to a pediatric patient, and in FIG. 1B a respiratory effort applied to a pediatric patient.
Figure 1B:
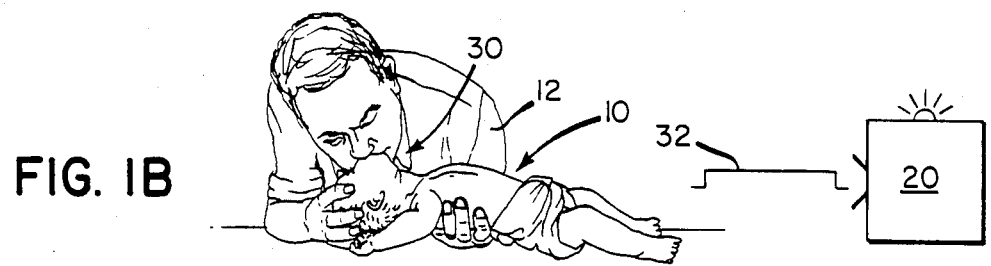

Referring now to FIGS. 1A and 1B, a very young patient 10 is shown receiving cardio-pulmonary resuscitation by an individual 12. In FIG. 1A, the patient 10, here pictured is an infant, is positioned on its back, and numerous compressions of the chest of the patient are applied by individual 12 as illustrated by a short arm stroke from a position 14' to a position 14 along the direction of arrow 16.

Chest compressions are performed in accordance with audio and visual signals provided by a resuscitation-assistive timer 20 which provides audio and light cues in accordance with waveform 22, in this case a pulsed waveform including five pulses for the compressive cycle, the five pulses being optimum for infant resuscitation. The audio signal emanates from a speaker 24, whereas the visual cues emanate from a light source 26.

After five pulsed cues are provided, referring to FIG. 1B, the individual performing the resuscitation then breathes the infant patient 10 as illustrated by the mouth-to-mouth resuscitation generally indicated at 30. This includes breathing into the patient for a time duration indicated by the audio and visual cues provided by timer 20 in terms of an elongated pulse 32.

It should be noted that what is depicted is resuscitation performed by one person. However, if two people are available, the preferable procedure is for one person to perform the chest compression routine, while the other performs the respiration routine. Moreover, if one person is used and the patient is over the age of an infant, then the aforementioned 15:2 ratio is preferably used.

Figure 2:
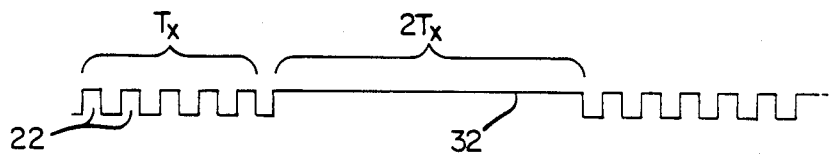
FIG. 2 is a waveform diagram illustrating the relative lengths of the pulses provided by the apparatus of FIGS. 1A and 1B; and, FIG. 3 is a block diagram illustrating one embodiment of apparatus capable of generating the waveform of FIG. 2.

Referring to FIG. 2, the length of pulse 32 of FIG. 1B is determined by the time period $T_x$ occupied by pulses 22 which are used in the compressive cycle. Thus, in one embodiment the length of the respiration is $2T_x$, it being appreciated that any ratio which proves effective between the period for the compressive pulses and the period for the respiratory pulse is within the scope of this invention.

Figure 3:
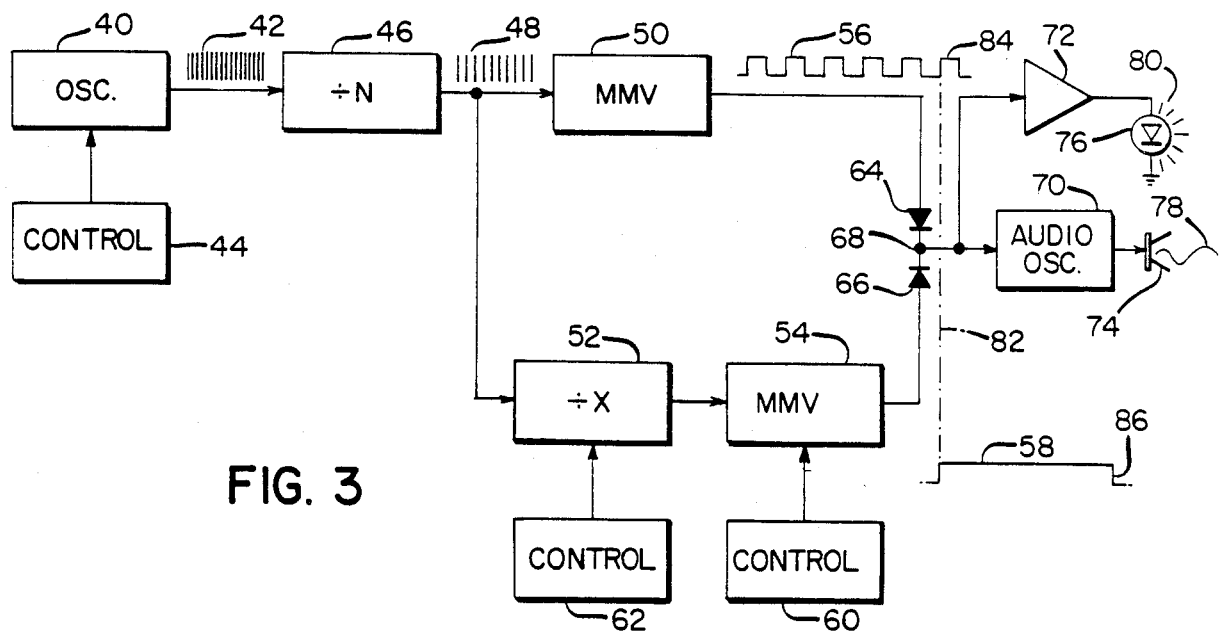

Referring to FIG. 3, one system for providing a number of short pulses followed by an elongated pulse is illustrated in which a variable frequency oscillator 40 provides a continuous stream of clock pulses 42, with the frequency of the oscillator being controlled by control unit 44. This stream of pulses is provided to a divide-by N counter 46 which produces a reduced frequency stream of pulses 48 which are applied to a first one-shot monostable multivibrator 50. Pulse stream 48 is also applied to a divide-by X counter 52, the output of which is provided to a second one-shot monostable multivibrator 54. The output of monostable multivibrator 50 is a pulse train 56 having a predetermined pulse duration.

The output of monostable multivibrator 54 is an elongated pulse 58, the duration of which is controlled via control unit 60 so that it is a predetermined exact multiple of the period of a predetermined number of pulses in pulse train 56. A control 62 is provided to divide-by X counter 52 so as to control the number by which the stream of pulses 48 is divided.

The outputs of multivibrator 50 and 54 are applied, respectively, through diodes 64 and 66 functioning as an OR gate to a point 68 coupled respectively to control operation of an audio oscillator 70 and an amplifier 72. The output of audio oscillator 70 is activated by the presence of a pulse at the point 68 and its output is applied to a loudspeaker 74, whereas the output of amplifier 72 is applied to a light source 76 which, in one embodiment, may be a light emitting diode. The outputs of loudspeaker 74 and light source 76 are illustrated, respectively, by waveforms 78 and 80.

In operation, oscillator 40 may be variable between 10,000 kHz and 500 Hz. Assuming that oscillator 40 is operating at 1 kHz and assuming that N=600, then the frequency of pulse stream 48 is 1.666 Hz or 100 pulses per minute. Assuming a divide-by-five circuit for counter 52, this results in 20 elongated pulses 58 per minute, with each elongated pulse following five of the relatively shorter pulses in pulse train 56.

As illustrated by dashed line 82, multivibrator 54 is triggered at the leading edge of pulse 84, which is the sixth pulse in pulse train 56. In one embodiment, its duration is 10 pulses in length such that its trailing edge 86 corresponds to the trailing edge of the sixteenth pulse in pulse train 56 or the trailing edge of the tenth pulse of pulse train 56 after the initiation of the elongated pulse.

It will be appreciated that varying the frequency of oscillator 40 varies the period of the five pulses of pulse train 56 such that, if desired, the duration of the elongated pulse can be adjusted to correspond to an integral number of pulses from pulse train 56. Adjustment of controls 44 and 60 permits variation in the rate of the signals used to synchronize CPR effort to the age of the patient.

What has been provided is a method and apparatus for providing audio and visual cues for the resuscitation of individuals regardless of age and regardless of the training of the individual performing the resuscitation. This system is particularly useful in pediatric resuscitations where the rhythms for pediatric resuscitation vary remarkedly from those associated with adults.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. A method for stimulating an optimal response in an individual performing cardiopulmonary resuscitation to cue the individual to perform a series of chest compressions followed by a respiration step, said cues being provided at the proper time and for the optimal duration for optimal cardiopulmonary resuscitation comprising the steps of:
   automatically cueing said individual by emitting a predetermined number of chest compression marking signals in the form of uniform intensity short pulses being emitted at a rate which is variable to correspond to a predetermined age, the length of the cueing pulses prescribing the length of the actions to be taken;
   automatically cueing said individual by emitting a respiration marking signal in the form of a uniform intensity elongated pulse having a duration matching a desired respiration duration, said elongated pulse being emitted subsequent to said predetermined number of chest compression marking signals, the duration of said elongated pulse being longer than the time occupied by each predetermined chest compression marking signal, the length of the elongated cueing pulse prescribing the length of the action to be taken; and,
   automatically repeating said first and second mentioned emitting steps in sequence, whereby optimal resuscitation may be achieved.

2. The method of claim 1 wherein the duration of the respiration marking signal is a predetermined multiple of the duration of the predetermined number of the chest compression marking signals.

3. The method of claim 2 wherein said multiple is two.

4. The method of claim 1 wherein the predetermined number of signal repetitions is five.

5. The method of claim 1 wherein said signals are audible.

6. The method of claim 1 wherein said signals are in the form of light pulses.

7. A timer for stimulating an optimal response in an individual performing cardiopulmonary resuscitation to cue the individual to perform a series of chest compressions followed by a respiration step, said cues being provided at the proper time and for the optimal duration for optimal cardiopulmonary resuscitation, comprising:
   means for automatically cueing said individual by emitting a predetermined number of chest compression marking signals in the form of uniform intensity short pulses each of a duration matching a desired chest compression duration, said short pulses being emitted at a rate which is variable to correspond to a predetermined patient age, the length of the cueing pulses prescribing the length of the actions to be taken;
   means for automatically cueing said individual by emitting a respiration marking signal in the form of a uniform intensity elongated pulse having a duration matching a desired respiration duration, said elongated pulse being emitted subsequent to said predetermined number of chest compression marking signals, the duration of said elongated pulse being longer than the time occupied by each predetermined chest compression marking signal, the length of the elongated cueing pulse prescribing the length of the action to be taken; and
   means for automatically actuating said cueing means for repeating the emissions therefrom, whereby optimal resuscitation may be achieved.

8. The timer of claim 7 wherein the ratio of the number of said predetermined number of pulses to said elongated signal is 5:1.

9. The timer of claim 7 wherein the character of the number of said predetermined number of pulses and said elongated signal is such as to identify 15 chest compressions followed by two respirations.

10. The timer of claim 7 wherein the duration of said elongated signal is twice the time period occupied by said predetermined number of signals.

11. The timer of claim 7 further including means for varying the duration of said elongated pulse in accordance with the pulse repetition rate of said predetermined number of pulses.

12. The timer of claim 11 wherein said automatic cueing means includes:
   an oscillator for providing a first train of clock pulses;
   means for dividing the number of said clock pulses by a predetermined number thereby to establish a second train of clock pulses;
   a first one shot monostable multivibrator clocked by said second train of clock pulses so as to produce a third train of pulses, each having a predetermined duration set by said first multivibrator;
   means for dividing the number of the pulses in said second train by a predetermined number so as to establish a pulse after said predetermined number of pulses in said second train has occurred;
   a second one shot monostable multivibrator clocked by said last mentioned pulse so as to provide an elongated pulse; and,
   cue signal generating means coupled so as to be responsive either to said third train of pulses or said elongated pulse so as to produce a cue signal having a duration corresponding to that of the pulses coupled thereto.

13. The timer of claim 12 wherein said oscillator is a variable frequency oscillator, said means for varying said pulse repetition rate coupled to said oscillator.

14. The timer of claim 13 further including means for controlling the duration of said elongated pulse.

15. The timer of claim 14 further including means for varying the predetermined division number of said means for dividing the pulses in said second train of pulses.

* * * * *